(12) United States Patent
Katsura

(10) Patent No.: US 12,492,892 B2
(45) Date of Patent: Dec. 9, 2025

(54) THREE-DIMENSIONAL MEASUREMENT SYSTEM

(71) Applicant: DENSO WAVE INCORPORATED, Chita-gun (JP)

(72) Inventor: Shoji Katsura, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 63 days.

(21) Appl. No.: 18/278,793

(22) PCT Filed: Jan. 20, 2022

(86) PCT No.: PCT/JP2022/001942
§ 371 (c)(1),
(2) Date: Sep. 1, 2023

(87) PCT Pub. No.: WO2022/181128
PCT Pub. Date: Sep. 1, 2022

(65) Prior Publication Data
US 2024/0151518 A1    May 9, 2024

(30) Foreign Application Priority Data

Feb. 24, 2021  (JP) ................. 2021-027774

(51) Int. Cl.
*G01B 11/25* (2006.01)
*G01B 11/02* (2006.01)

(52) U.S. Cl.
CPC ............ *G01B 11/254* (2013.01); *G01B 11/02* (2013.01)

(58) Field of Classification Search
CPC ....... B25J 19/021; B25J 9/1679; G01B 11/02; G01B 11/25; G01B 11/254; G01B 5/0004;
(Continued)

(56) References Cited

U.S. PATENT DOCUMENTS

| 4,596,934 A | 6/1986 | Yanaka et al. | |
| 2002/0036779 A1* | 3/2002 | Kiyoi | G01B 11/25 356/606 |

(Continued)

FOREIGN PATENT DOCUMENTS

| CN | 102980513 A | 3/2013 |
| JP | 2000146781 A * | 5/2000 |

(Continued)

*Primary Examiner* — Sunghee Y Gray
(74) *Attorney, Agent, or Firm* — Oliff PLC

(57) ABSTRACT

A three dimensional measurement system has a measurement unit that images the measuring object and that has a light projecting device projecting projected light onto the measuring object and a light receiving device receiving the reflected light. The system has a specular reflection member that forms a mounting surface for mounting the measuring object and reflects projected light at a specific angle. The system has a data acquisition unit that acquires imaging data and a coordinate calculation unit that calculates three dimensional coordinates for the part of the imaging data whose brightness is higher than the lower limit brightness and does not calculate three dimensional coordinates for the part whose brightness is lower than the lower limit brightness. The light receiving device is arranged at a position where the brightness of the part where the specular reflection member is imaged is lower than the lower limit brightness.

2 Claims, 18 Drawing Sheets

(58) Field of Classification Search
CPC ............... G03C 5/08; G03G 21/046; G05B 2219/39543; G05B 2219/40584; G05B 2219/45061; G06T 7/521; H04N 1/00846; H04N 1/00859; H04N 1/00867
USPC .................................................. 356/610
See application file for complete search history.

(56) References Cited

U.S. PATENT DOCUMENTS

| | | |
|---|---|---|
| 2015/0310599 A1 | 10/2015 | Yamamoto |
| 2016/0073104 A1* | 3/2016 | Hillebrand ............ G06F 3/0325 348/47 |
| 2019/0206076 A1 | 7/2019 | Yamamoto |
| 2021/0358162 A1 | 11/2021 | Yamamoto |

FOREIGN PATENT DOCUMENTS

| | | |
|---|---|---|
| JP | 2003-098120 A | 4/2003 |
| JP | 2007-102718 A | 4/2007 |
| JP | 2019-145177 A | 8/2019 |

\* cited by examiner

FIG.1
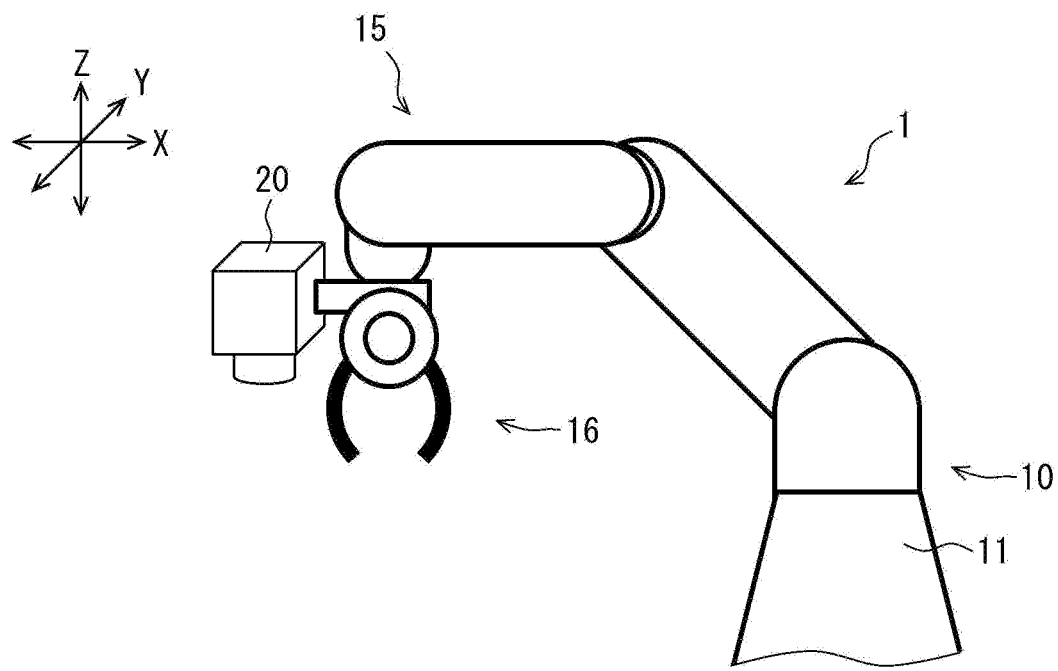
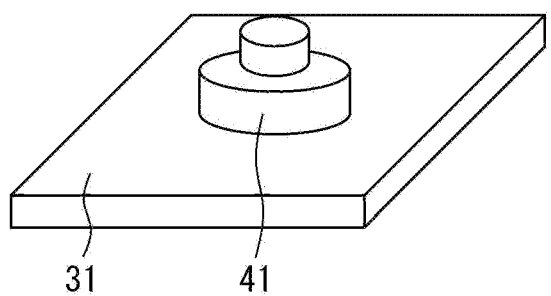

FIG.13
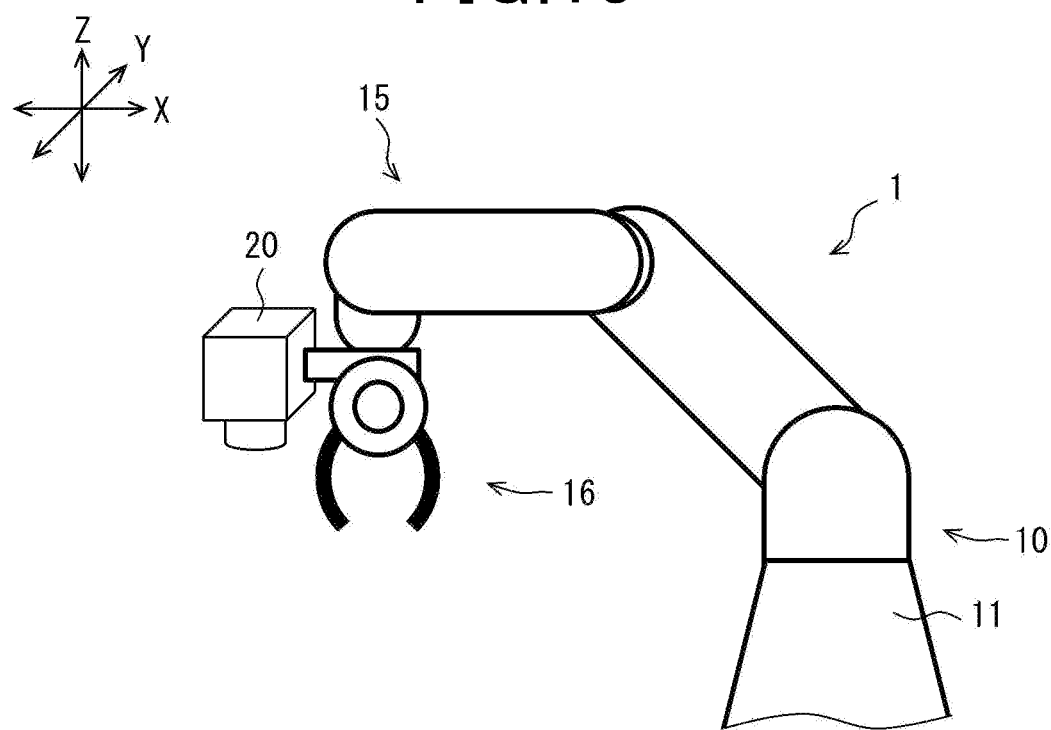
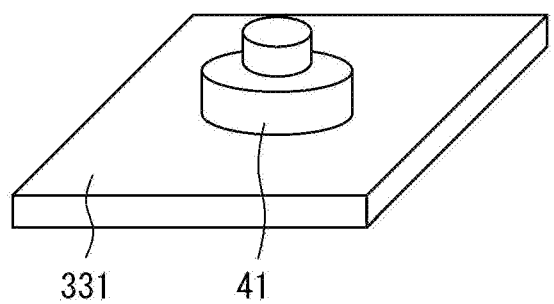

THREE-DIMENSIONAL MEASUREMENT SYSTEM

CROSS-REFERENCING RELATED APPLICATIONS

This application is based on Japanese patent application 2021-27774 filed in Japan on 20 Feb. 2021, and the contents of the base application are incorporated by reference throughout.

TECHNICAL FIELD

The disclosure in this specification relates to three-dimensional measurement systems.

BACKGROUND TECHNOLOGY

Patent Document 1 discloses an image processing method for obtaining image data of an object. The contents of the prior art documents are incorporated by reference as descriptions of the technical elements in this specification.

PRIOR ART LITERATURE

Patent Literature

Patent Document 1: Japanese Patent Laid-Open No. 2019-145177

Overview of the Invention

The structure of the patent document 1 discloses background removal processing such as storing a background image not showing the components and the robot hand in the memory beforehand, calculating the difference between the captured image and the stored background image, and removing the background. However, when the background is removed by calculating the difference with the background image, the timing of imaging the background and the timing of imaging the object are different. For this reason, a slight error may occur even in the same background due to the influence of variations in the current flowing through the camera during imaging. This tends to reduce the accuracy of background removal. In the light of the above, or in some other light not mentioned, further improvements are required in three-dimensional measurement systems.

One object of this disclosed is providing a three dimensional measurement system capable of removing the background with high precision.

The three dimensional measurement system disclosed herein measures the three dimensional shape of an measuring object.

The three-dimensional measurement system that performs shape measurement comprising;
- a measuring unit for imaging the measuring object having a light projecting device for projecting projected light onto the measuring object and a light receiving device for receiving reflected light,
- a reflecting member that forms a mounting surface for mounting the measuring object and reflects the projected light at a specific angle, and
- a data acquisition unit for acquiring imaging data imaged using a measurement unit, and a coordinate calculation unit that calculates three dimensional coordinates for a part of the imaging data whose brightness is higher than a lower limit brightness and does not calculate three dimensional coordinates for a part whose brightness is lower than the lower limit brightness.

The light receiving device is arranged in a position where the brightness of the part where the reflecting member is imaged is lower than the lower limit brightness.

According to the disclosed three dimensional measurement system, the light receiving device is arranged at the position where the brightness of the part is below the lower limit brightness. Therefore, the reflected light received by the light receiving device can be prevented from including the light reflected on the mounting surface. Therefore, the influence of light other than the object reflected light can be reduced, and the three dimensional point cloud be measured with high accuracy. Accordingly, a three dimensional measurement system that can remove the background with high precision can be provided.

In addition, the three dimensional measurement system disclosed herein is the three dimensional measurement system that performs shape measurement for measuring the three dimensional shape of the measuring object.

A three dimensional measurement system comprising;
- a measurement unit having a light projecting device for projecting projected light onto a measuring object and a light receiving device for receiving reflected light,
- a diffusing member that forms a mounting surface for mounting the measuring object and diffuses the projected light,
- a data acquisition unit that acquires imaging data imaged by a measurement unit, and a coordinate calculation unit that calculates three dimensional coordinates for a portion of the imaging data whose brightness is lower than an upper limit brightness and does not calculate three dimensional coordinates a portion where the brightness is higher than the upper limit brightness.

The light receiving device is arranged in a position where the brightness of the part whose brightness is higher than the upper limit brightness.

According to the disclosed three dimensional measurement system, the light receiving device is located at a position where the brightness of the corresponding portion is higher than or equal to the upper limit brightness. For this reason, among the reflected light received by the light receiving device, it is easy to set the brightness of the mounting surface reflected light, which is the light of the background part, to a saturation brightness or higher. Therefore, it is possible to calculate the three dimensional point group of the measuring object with high accuracy by calculating the three dimensional point group by excluding the luminance over the saturation luminance. Accordingly, a three dimensional measurement system could remove the background with high precision can be provided.

In the disclosed three-dimensional measurement system, the system has a light projecting device that projects a near-infrared light (PL), a light receiving device that receives reflected near-infrared light (RL), which is the light reflected by the projected light, and a measurement unit that images the object to be measured.

In the disclosed three dimensional measurement system, the system has a holding table having a mounting surface for mounting the measuring object which is equipped with a mesh structure through which projected light can pass and a specular member that reflects light passing through this mesh structure in a direction that does not return to the mesh structured holding table.

In the disclosed three-dimensional measurement system, the system is also equipped with a data acquisition unit that acquires data captured by the measurement unit and a coordinate calculation unit that calculates three dimensional coordinates for the part of the imaging data whose brightness is higher than a lower limit brightness and does not calculate three dimensional coordinates for the part whose brightness is lower than the lower limit brightness.

In the disclosed three dimensional measurement system, as the light passing through the mesh structured holding table reflects in a direction that does not return to the mesh structured holding table, accurate measurements can be made for avoiding the influence of disturbance caused by reflected light. In particular, since the projected and reflected light are near-infrared rays, disturbances caused by ambient light could be suppressed.

In the disclosed three-dimensional measurement system, the system has a light projecting device projected light (PL) is projected onto the measuring object, a light receiving device that receives reflected light (RL), which is the light reflected by the projected light, and a measurement unit that images the measuring object.

In the disclosed three dimensional measurement system, the system has a light absorbing member that absorbs projected light and that provides a mounting surface for mounting the measuring object, a data acquisition unit that acquires data taken by a measurement unit, and a coordinate calculation unit that calculates three dimensional coordinates for a portion of the imaging data where the internal brightness is higher than a lower limit brightness and does not calculate the three dimensional coordinates for a portion where the brightness is lower than the lower limit brightness.

In the disclosed three dimensional measurement system, as a mounting surface for mounting the measuring object is a light absorbing member that absorbs projected light, the influence of disturbance caused by reflected light from the mounting surface can be avoided. Therefore, the multipath problem could be solved and measurements could be made with high accuracy.

The multiple aspects disclosed in this specification accomplish their respective objectives to employ different technical means. The scope of the claim and the symbols in parentheses described in this section are illustrative of the correspondence with the portion of the embodiment described below and are not intended to limit the technical scope. The objects, features and effects disclosed in this specification will be made clearer by reference to the subsequent detailed description and the accompanying drawings.

A BRIEF DESCRIPTION OF THE DRAWINGS

FIG. 1 is a schematic diagram showing the schematic configuration of the recognition system.

FIG. 13 is a configuration diagram showing the schematic configuration of the recognition system in the third embodiment.

EMBODIMENT FOR CARRYING OUT INVENTION

Figure 2:
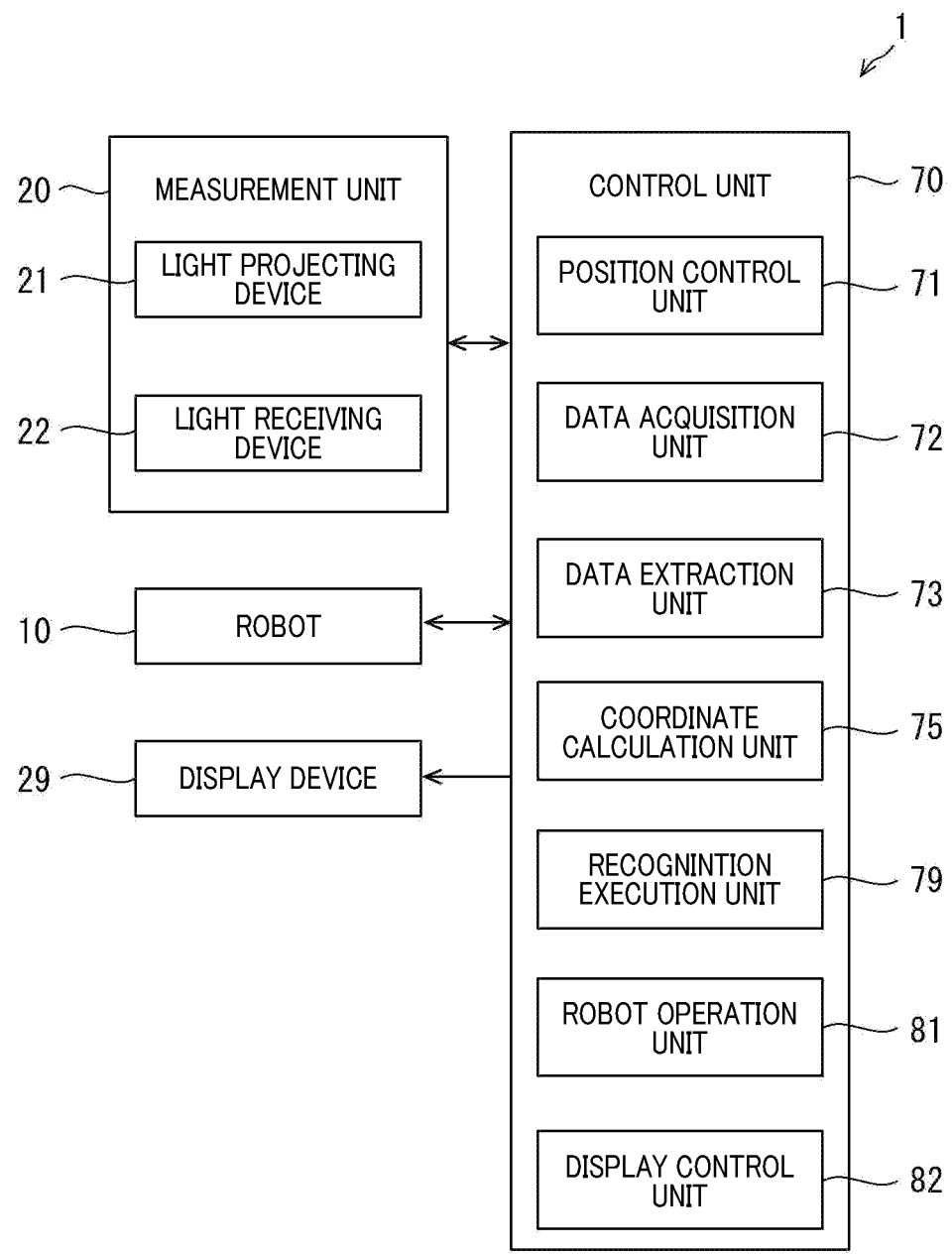
FIG. 2 is a block diagram of the control of the recognition system.

A plurality of embodiments will be described with reference to the drawings. In more than one embodiment, functionally and/or structurally corresponding and/or associated parts may be given the same reference number, or different reference number in hundreds or more places. For the corresponding parts and/or associated parts, reference can be made to descriptions of other embodiments.

First Embodiment

In FIG. 1, the recognition system 1 is a system with the function of a three-dimensional measurement system. The recognition system 1 is a system for recognizing the position and posture of a measuring object 41 of a known shape. The position and posture of the measuring object 41 means the position of the measuring object 41 and the posture of the measuring object 41. However, it is not necessary to recognize both position and posture, and it may be a configuration that recognizes either position or posture.

The recognition system 1 performs shape measurement to calculate the three-dimensional coordinates of a measuring object 41 imaged using a measurement unit 20 for a plurality of measurement points. Furthermore, the recognition system 1 holds model data, which is data indicating the model shape of the measuring object 41. With this, the recognition system 1 is able to recognize the three-dimensional objects obtained by the shape measurement. The position and posture recognition of the measuring object 41 is performed by matching the dimensional coordinates with the model data. Details of the measurement unit 20 will be described later.

The recognition system 1 is available for various tasks using the robot 10. Examples of tasks using the robot 10 include assembling parts at specific locations, picking parts, visual inspection to check parts for scratches or chips, and grasping parts. However, the recognition system 1 may be used for tasks that do not involve the robot 10.

The robot 10 is equipped with a base 11, a robotic arm 15 and a robotic hand 16. Robot 10 is a vertical multi-articulated robot. However, a horizontal articulated robot or the like may be employed as the robot 10. The base 11 is fixed to the installation surface where the robot 10 is installed using bolts or the like.

The robotic arm 15 is composed of multiple shaft components connected by articulated components. The joint component includes a motor, and the angle of the joint component can be freely controlled by controlling the motor. The multiple shaft components are relatively rotatable connected to each other via articulated components. The robotic arm 15 is connected to the base 11.

The robotic hand 16 is attached to the end of the robotic arm 15. The robotic hand 16 includes a motor. The robotic hand 16 is configured to be relatively rotatable around the axis of the shaft component provided in the robotic arm 15 by controlling the motor.

The robotic hand 16 has a pair of claws. This claw parts rotates around the rotation axis of the robotic hand 16. The robotic hand 16 is configured so that the measuring object 41 mounted on the specular reflecting member 31 can be grasped by performing opening and closing operations to enlarge and reduce the spacing between the claw parts. In addition, the robot 10 can move the robotic arm 15 or the robotic hand 16 with the condition that the robotic hand 16 grasps the measuring object 41. With this, the position and posture of the measuring object 41 can be changed. In order to grasp the measuring object 41, it is necessary to accurately recognize the position and posture of the measuring object 41.

The specular measuring object 41 is mounted on the specular reflection member 31. The upper surface, which is the surface on which the measuring object 41 is placed, of the specular reflection member 31 is a minor surface. Therefore, the light projected on the specular reflection member 31 is totally reflected. Therefore, the reflection angle should be controlled by controlling the incident angle of the light projected onto the specular reflection member 31. A metal plate that is used in the body of a vehicle and has been mirror-treated by polishing or the like may be adopted as the specular reflecting member 31. The specular reflection member 31 provides an example of a reflective member.

The specular reflection member 31 shall be black in color, which easily absorbs the energy of the projected light. However, when the measuring object 41 and the specular reflection member 31 are the same color, it is difficult to distinguish between the measuring object 41 and the specular reflection member 31. For this reason, it is preferable that the color of the specular reflection member 31 is selected from a different color from that of the measuring object 41, which absorbs light energy easily.

The specular reflection member 31 is a square plate member. It should be noted, the shape of the specular reflection member 31 needs to be sufficiently larger than the object 41 to be measured, and is not limited to the above examples. For example, a box-shaped component in which a board member with a minor-treated bottom surface is laid may be adopted as the specular reflection member 31.

The number of measuring objects 41 mounted on the specular reflection member 31 is not limited to 1. For example, multiple measuring objects 41 may be mounted on the specular reflection member 31 in a state that they overlap each other. The measuring object 41 is positioned at a standard position set approximately at the center of the specular reflecting member 31, which is the mounting surface. The standard position is the position where the object 41 to be measured is placed.

The measuring object 41 could be any shape. The measuring object 41 may employ two disks of different diameters arranged side by side on the same axis. The measuring object 41 is mounted on the specular reflecting member 31 so that a disk portion with a small diameter is positioned on the upper side.

The measurement unit 20 is a device for measuring the shape of the measuring object 41. The measurement unit 20 has a function of imaging the surface image of the measuring object 41 and a function for calculating a three-dimensional point of the measuring object 41. A three-dimensional point is a set of data obtained by calculating the three-dimensional coordinates at the measurement points of the measuring object 41 for multiple measurement points. In other words, the measuring points are each point representing the coordinates of the measuring object 41. Three-dimensional coordinates have X, Y and Z coordinates as coordinate components. A distance image sensor that calculates distance using triangulation principles such as a phase shift method, for example, could be adopted as the measurement unit 20.

The measurement unit 20 is provided on the robot hand 16. For this reason, the position of the measurement unit 20 can be adjusted by controlling the position of the robotic arm 15 or the robotic hand 16.

In FIG. 2, a control unit 70 for controlling the recognition system 1 is connected to the robot 10, the measurement unit 20 and the display device 29. The control unit 70 acquires the rotational position, etc., of each rotational axis of the robot 10. The control unit 70 controls the movement of the robot 10.

The display device 29 is a device that displays position and posture recognition to the user. The display device 29 displays, for example, the captured image captured by the measurement unit 20. The user can confirm the imaging range by the measurement unit 20, the brightness of the captured image, etc., by visually confirming the contents displayed on the display device 29. The control unit 70 controls the presence or absence of display and the display content of the display device 29.

The measurement unit 20 is equipped with a light projecting device 21 and a light receiving device 22. As the light projecting device 21, a projector capable of projecting pattern light used for the phase shift method could be adopted. As the light projecting device 21, a device capable of projecting directional light such as laser light could be adopted. It is preferable that the light projected from the light projecting device 21 is distinguishable from the light of the fluorescent lamp or sunlight by intensity and wavelength. As the light receiving device 22, a camera which images the measuring object 41 under the condition that the pattern light is projected could be adopted.

The measuring unit 20 contains the light projecting device 21 and the light receiving device 22 in one housing. For this reason, the distance between the light projecting device 21 and the light receiving device 22 is always constant. The control unit 70 acquires the measurement result of the shape measurement by the measurement unit 20. The control unit 70 controls the measurement unit 20 to perform shape measurement.

The control unit 70 is equipped with a position control unit 71, a data acquisition unit 72, a data extraction unit 73, a coordinate calculation unit 75, and a recognition execution unit 79. The position control section 71 controls the position of the measurement unit 20 with respect to the measuring object 41 by controlling the movement of the robot 10. The data acquisition unit 72 acquires measurement results measured by the measurement unit 20. The data extraction unit 73 extracts data to be used for calculating the three-dimensional point from the measurement results acquired by the data acquisition unit 72. The coordinate calculation unit 75 calculates a three-dimensional point based on data extracted by a data extraction unit 73. The recognition execution part 79 executes position and posture recognition by matching the three-dimensional point calculated by the coordinate calculation part 75 with the model data.

The control unit 70 is equipped with a robot operation unit 81 and a display control unit 82. The robot operation unit 81 controls opening and closing of the claws of the robotic hand 16 and performs picking operation. The display control unit 82 controls the presence or absence of display and the display content of the display device 29.

Figure 3:
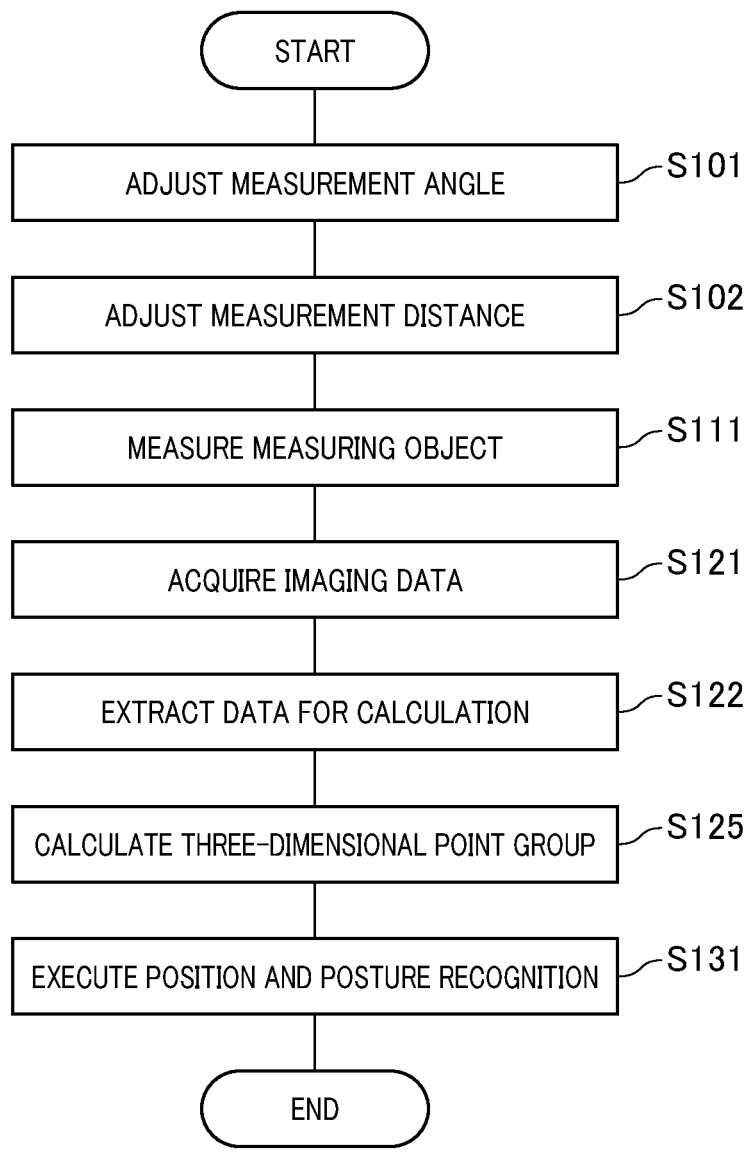
FIG. 3 is a flowchart of the control of the recognition system.

The flow of position and posture recognition for recognizing the position and posture of the measuring object 41 using the recognition system 1 is described below. In FIG. 3, when the control process related to position and posture recognition is started such that the power of the robot 10 is turned on by the user, the position control unit 71 adjusts the measurement angle in step S101. The measurement angle is the angle of the measurement unit 20 with respect to the specular reflection member 31. More specifically, the angle of the measurement unit 20 is adjusted so that the direction of light projection of the measurement unit 20 is in a position relationship that is not perpendicular to the mounting surface, which is the upper surface of the specular reflection member 31.

Figure 4:
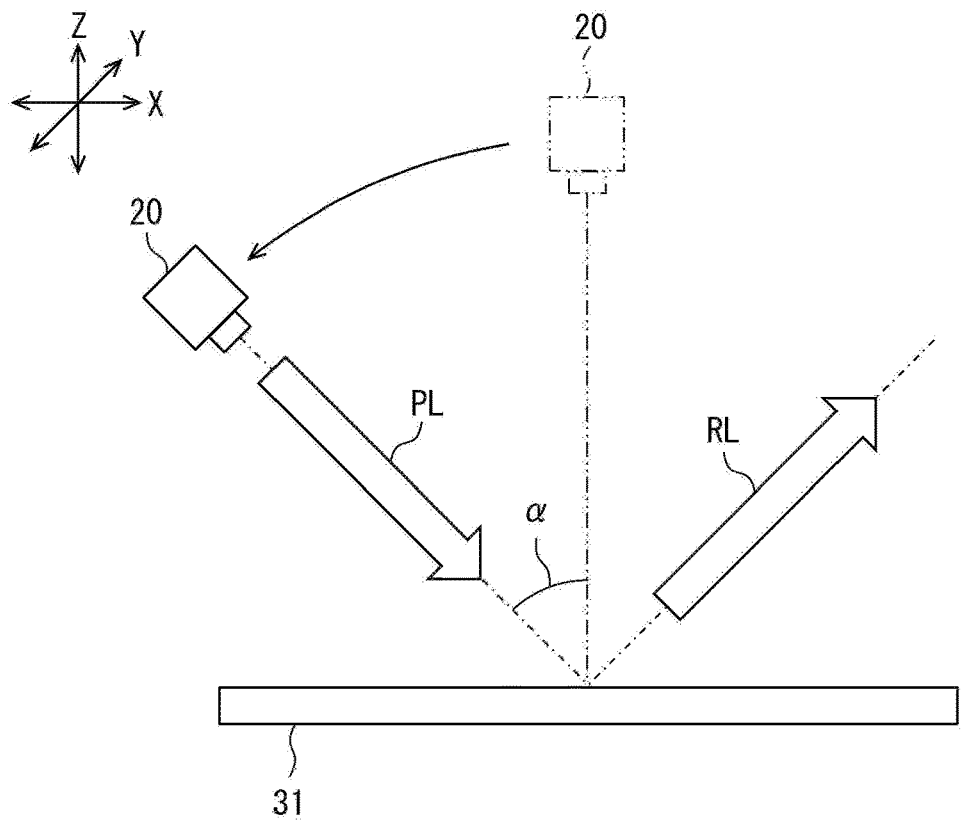
FIG. 4 is an illustration for explaining the adjustment of the measurement angle.

In FIG. 4, the light projection direction of the measurement unit 20 is inclined by an angle a from the direction perpendicular to the mounting surface, which is the upper surface of the specular reflection member 31. The projected light PL projected from the measuring unit 20 is totally reflected by the specular reflection member 31. This causes the reflected light RL to travel in a direction where the measuring unit 20 does not exist so that the reflected light RL does not return to the measurement unit 20. It could be said that the measurement unit 20 is provided at a position avoiding the traveling direction of the reflected light RL reflected by the specular reflection member 31.

In the angle adjustment of the measurement unit 20, the reflection by the specular reflection member 31 is only necessary to adjust the position where the reflected light RL does not return to the measurement unit 20. Thus, angle α is not limited to a specific angle. However, if the angle α is too small, some of the reflected light RL returns to the measurement unit 20, and the brightness based on the reflected light RL is easily detected. On the other hand, if the angle α is too large, when the measuring object 41 has a thin shape, the area of the measuring object 41 included in the imaging range tends to become small, and measurement accuracy tends to deteriorate. Therefore, it is preferable to adjust the angle α at which the measurement accuracy can be as high as possible within the range where the reflected light RL reflected by the specular reflection member 31 is not measured. After adjusting the measurement angle, proceed to step S102.

In step S102, the position control unit 71 adjusts the measurement distance. The measurement distance is the distance between the measurement unit 20 and the specular reflection member 31. Preferably, the measurement distance is such that the entire measuring object 41 can be imaged and the background, which is a configuration other than the measuring object 41, is reduced as much as possible.

Figure 5:
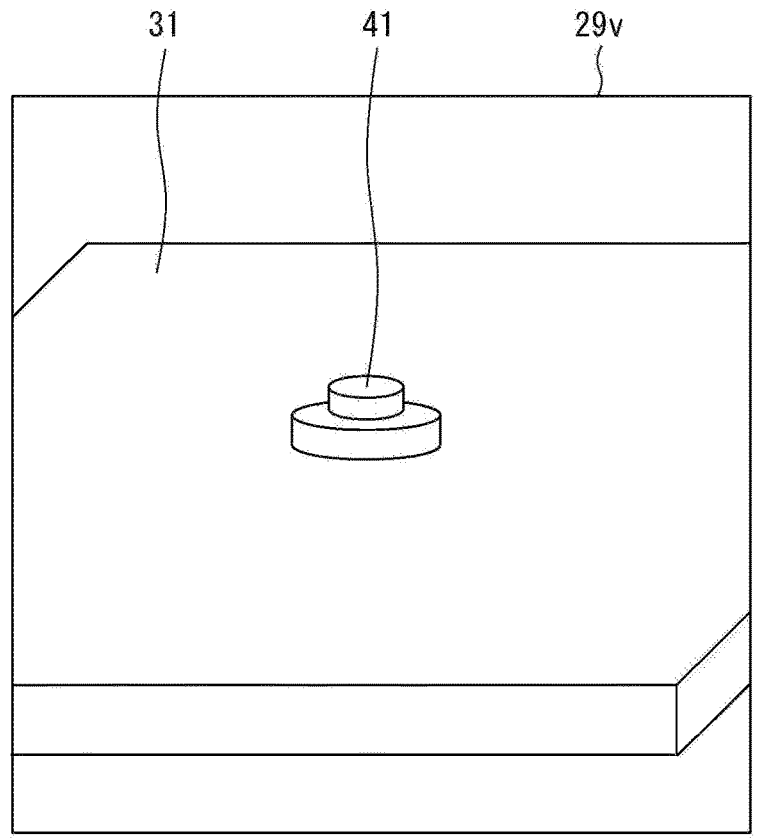
FIG. 5 shows the display screen before adjusting the measurement distance.

In FIG. 5, the display screen 29v displayed on the display device 29 includes components other than the measuring object 41 and the specular reflection member 31. When the shape measurement of the measuring object 41 is performed in this state shown in FIG. 5, the measurement result includes the components other than the measuring object 41 and the specular reflection member 31. Therefore, it can be stated that the distance between the measurement unit 20 and the specular reflection member 31 should be reduced.

Figure 6:
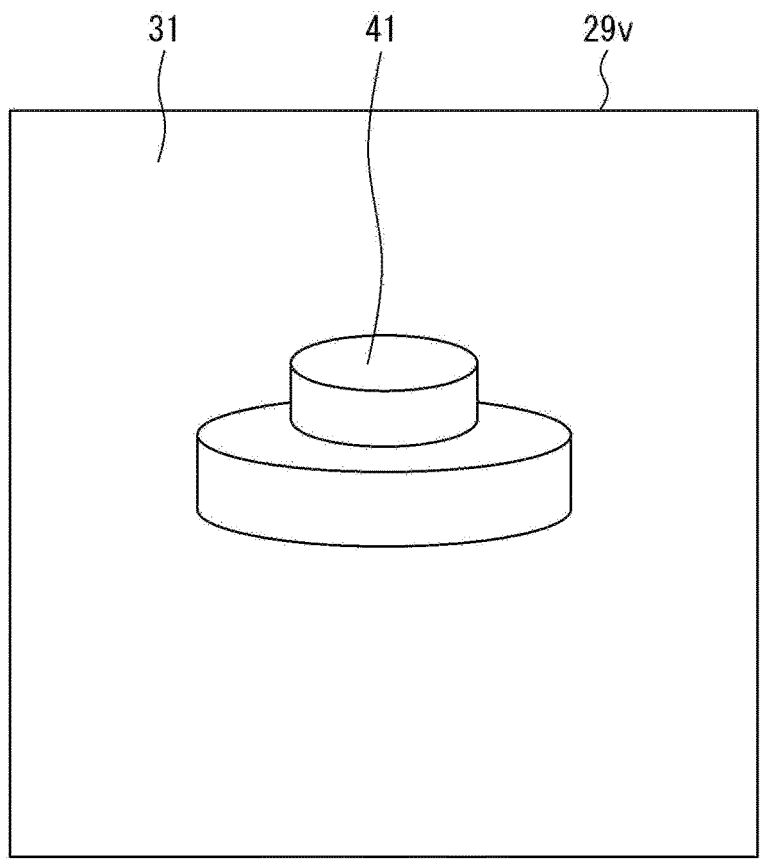
FIG. 6 shows the display screen after adjusting the measurement distance.

In FIG. 6, the display screen 29v displayed on the display device 29 contains no components other than the measuring object 41 and the specular reflection member 31. In addition, the entire measuring object 41 is contained within the display screen 29v. Therefore, it can be stated that the distance between the measurement unit 20 and the specular reflection member 31 is in an appropriate state. After adjusting the measurement distance, proceed to step S111.

In step S111, the control unit 70 uses the measurement unit 20 to measure the target of the measuring object 41. More specifically, pattern light such as a stripe pattern is projected on the measuring object 41, and the pattern light reflected by the measuring object 41 is received. At this step, the phase of the projected pattern light is changed to repeat the projection and reception. Thus, the three-dimensional shape of the measuring object 41 is measured from the difference between the projected pattern light and the received pattern light.

Figure 7:
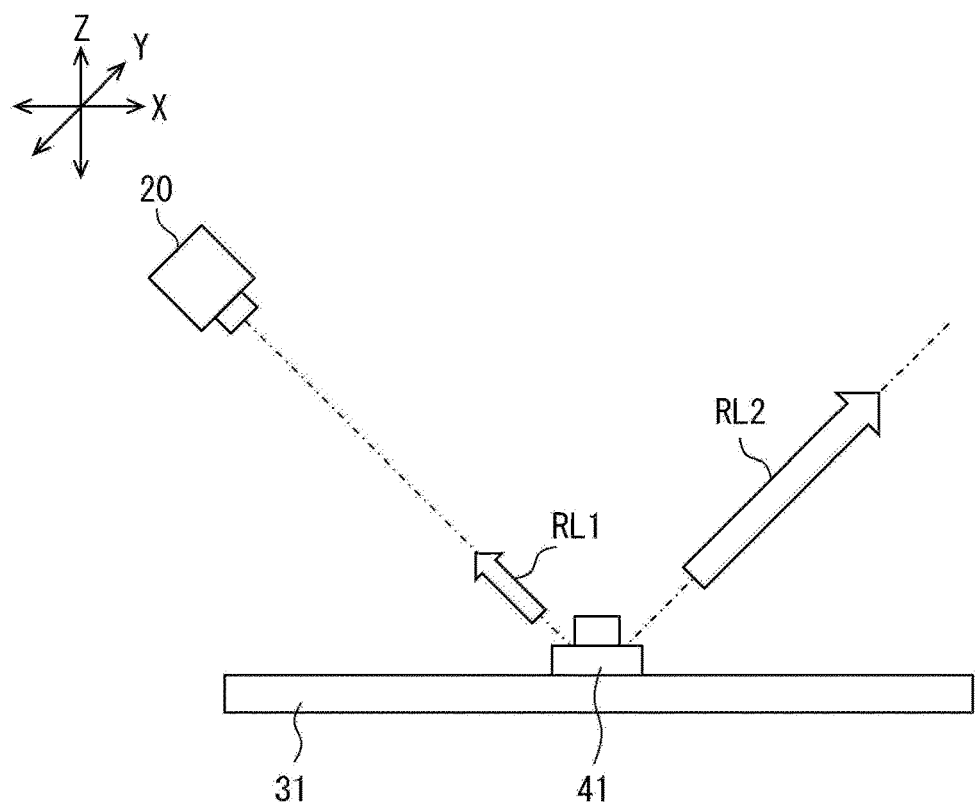
FIG. 7 is an illustration for explaining reflected light.

In FIG. 7, the projected light PL projected from the light projecting device 21 of the measurement unit 20 is partly reflected by the measuring object 41 and the remainder is reflected by the specular reflection member 31. Hereafter, the reflected light RL reflected by the measuring object 41 is referred to as the object reflected light RL1, and the reflected light RL reflected by the specular reflection member 31, which is the mounting surface, is referred to as the mounting surface reflected light RL2.

Since the object reflected light RL1 is diffused on the surface of the measuring object 41, the object reflected light RL1 is possible for spreading out in the various direction. However, only the object reflected light RL1 toward the measurement unit 20 is shown in the figure. On the other hand, the mounting surface reflected light RL2 is mostly totally reflected and travels in a specific direction, although some light is very slightly diffused on the surface of the specular member 31. In the figure, only the mounting surface reflected light RL2 totally reflected on the surface of the specular member 31 is shown.

The energy of the projected light PL projected on the specular reflection member 31 is partly absorbed by the specular reflection member 31. At this moment, since the specular reflection member 31 is black, the energy absorbed by the specular reflection member 31 is larger than the color of white or the like. Therefore, even if some of the projected light PL is diffused by the specular reflection member 31, it is easy to reduce the energy of the diffused light.

The light receiving device 22 of the measurement unit 20 receives the object reflected light RL1 and measures the same for obtaining the brightness information of each measurement point of the measuring object 41. On the other hand, since it is provided at a position avoiding the traveling direction of the mounting surface reflected light RL2, it hardly receives the mounting surface reflected light RL2. That is, the energy of the mounting surface reflected light RL2 toward the light receiving device 22 is below the lower limit of the receiver sensitivity of the light receiving device 22, and the brightness obtained by the light receiving device 22 becomes zero.

Figure 8:
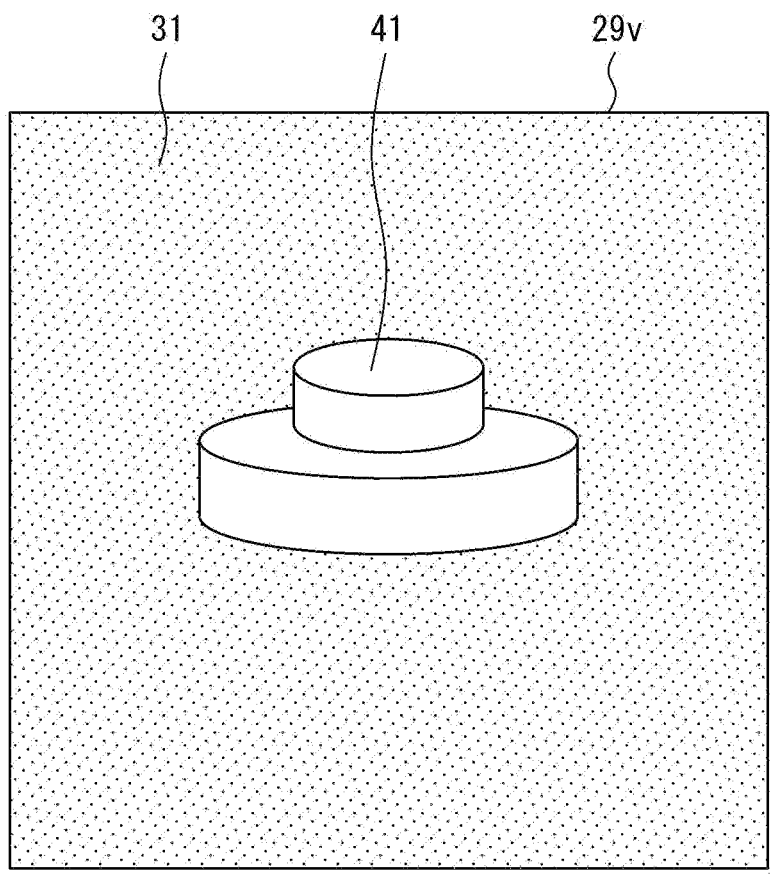
FIG. 8 shows a display screen displaying the brightness obtained by measurement.

In FIG. 8, the measuring object 41 as well as the specular reflection member 31 are displayed in the display screen 29v. In this figure, the area where the brightness is zero is indicated by a dot. The portion where the measuring object 41 is displayed has a brightness value higher than 0. On the other hand, the area where the specular reflection member 31 is displayed has 0 brightness. In summary, the portion where the measuring object 41 is imaged has a brightness higher than 0, and the background portion where anything other than the measuring object 41 is imaged has a brightness of 0. After measuring the measuring object 41, the process proceeds to step S121.

In step S121, the data acquisition unit 72 acquires the imaging data obtained by the measurement of the measuring object 41. The imaging data contains two-dimensional coordinates and brightness information for each pixel, which is the smallest unit of an image. The imaging data includes a portion where the measuring object 41 is imaged and a portion where the background surrounding the measuring object 41 is imaged. In the following, the part of the imaging data in which the measuring object 41 is imaged is sometimes referred to as an object data, and the part in which the background around the measuring object 41 is imaged is sometimes referred to as a background data.

The light receiving device 22 is provided at a position to receive the object reflected light RL1 but not the mounting surface reflected light RL2. Therefore, the object data is composed of pixels whose brightness is higher than zero, and the background data is composed of pixels whose brightness is zero. After acquiring the imaging data, the process proceeds to step S122.

In step S122, the data extraction unit 73 extracts data for calculation, which is used to calculate three-dimensional coordinates for each pixel, from the imaging data. More specifically, pixels whose brightness is greater than or equal to the upper brightness or less than or equal to the lower brightness are excluded from the imaging data, leaving only pixels showing brightness between the upper and lower brightness. When the light receiving device 22 detects the brightness in 256 steps from zero to 255, it is possible to set the upper limit brightness to 255, which is the saturation brightness, and the lower limit brightness to zero.

The upper limit brightness may be set to at least a value higher than the lower limit brightness. For example, the upper limit brightness may be set to a value lower than the saturation brightness and the lower limit brightness may be set to a value higher than zero. In the following, an example is given in which the upper limit brightness is set to the saturation brightness and the lower limit brightness is set to zero. The calculation data does not include background data with zero brightness, and only the object data is extracted. After extracting the data for calculation, the process proceeds to step S125.

In step S125, the coordinate calculation unit 75 calculates a three-dimensional point group using the calculation data. The calculation data does not include pixels with saturated brightness and pixels with zero brightness. In other words, the calculation data includes pixels of the object data but not pixels of the background data. Therefore, the three-dimensional coordinates of the measuring object 41 are calculated, but the three-dimensional coordinates are not calculated for the background other than the measuring object 41. In other words, the calculated three-dimensional point does not include any three-dimensional coordinates other than the measuring object 41. After the three-dimensional point group is calculated, the process proceeds to step S131.

In step S131, the recognition execution unit 79 executes position and posture recognition of the measuring object 41. More specifically, the three-dimensional point group of the measuring object 41 is matched with the model data. In matching, the three-dimensional coordinates of multiple measurement points included in the three-dimensional point group obtained by shape measurement are matched with the three-dimensional coordinates of multiple points included in the model data. For example, after matching the coordinates of a specific point, the process of matching the coordinates of points adjacent to that point is repeated to match the coordinates of all points. It should be noted, since three-dimensional point group contain some errors, the coordinates of each point do not have to match perfectly. For example, the matching result may be the position and posture in which the sum of the distances between the corresponding points of the model data and the three-dimensional point group is minimal. After performing the position and posture recognition, the control on the position and posture recognition is terminated.

After the completion of the position and posture recognition, the robot operation unit 81 operates the robot 10 to perform the necessary operation. More specifically, the robot operating unit 81 performs picking work or the like on the measuring object 41 for which the position and posture recognition has been completed. After the work using the robot 10 is completed, if there are other measuring objects 41 for which the position and posture recognition should be performed, the control related to the position and posture recognition is repeated.

Hereafter, the effect of the above described embodiment will be explained. According to the above described embodiment, the specular reflection member 31, which is the mounting surface, is arranged at a position where the brightness of the imaged portion becomes the brightness of the lower limit brightness or less. Thus, the reflection received by the light receiving device 22 is possible to suppress the inclusion of mounting surface reflected light RL2 which is the light of the background part in the reflected light RL. Therefore, the influence of light other than the object reflected light RL1 could be reduced to calculate the three-dimensional point group of the measuring object 41 with high accuracy. Therefore, a three-dimensional measurement system that can remove the background with high precision could be provided.

The specular reflective member 31, which is a reflective member, is black. For this reason, even when only slight light is diffused, it tends to reduce the energy of the diffused light. Therefore, it is difficult for the light receiving device 22 to receive light other than the object reflected light RL1. Therefore, it is easy to suppress erroneous calculation of the three-dimensional coordinates of the measuring object 41 by the light other than the object reflected light RL1.

The light receiving device 22 is arranged in a position avoiding the traveling direction of the surface reflected light RL2. Therefore, the background can be removed without performing processing such as removing the background from the difference between the pre-imaged background data and the imaged data. In other words, it can also be stated that the background is removed from the imaging data when the measuring object 41 is imaged. Therefore, it is easy to reduce the processing load in background removal and shorten the time required for background removal.

The display device 29 that displays the brightness of the imaged data is equipped. Thus, the user can check the brightness of the imaging data and perform alignment to adjust the angle, distance, etc. of the measuring unit 20.

The measurement unit 20 is provided on the robotic hand 16 of the robot 10. Therefore, the user can perform alignment to adjust the angle, distance, etc. of the measurement unit 20 by controlling the movement of the robot 10. Accordingly, it is possible to adjust the measurement unit 20 more finely than when it is adjusted by hand. Also, by having the robot 10 remember the position of the appropriate measuring unit 20, it is easy to complete the alignment at high speed.

An example of adjusting the measurement angle and the measurement distance of the measurement unit 20 so that the brightness of the whole background area becomes zero has been explained, but it is possible to adjust other than the measurement angle and the measurement distance. For example, by controlling the length of the exposure time, the brightness of the entire image data may be controlled. In this case, the brightness of the entire image data can be reduced by shortening the exposure time. Therefore, by shortening the exposure time so that the brightness of the part receiving the object reflected light RL1 does not become zero, the brightness of the whole background part becomes easy to become zero. In addition, by shortening the exposure time, the time required for imaging can be shortened, making it easier to shorten the time required for completion of the position and posture recognition.

Although the explanation was made using as an example the angle at which the brightness of the entire imaged portion of the specular reflection member 31 becomes lower than the lower limit brightness as the measurement angle, the measurement angle is not limited to the above example. For example, the angle at which only a part of the brightness of the imaged portion of the specular reflection member 31 is below the lower limit brightness may be used as the measurement angle. In this case, the measuring object 41 is placed at a position within the specular reflection member 31 where the brightness by the mounting surface reflected light RL2 is lower than the lower limit brightness. More specifically, it is assumed that the projection direction of the measurement unit 20 is perpendicular to the mounting surface of the specular reflection member 31. In this case, the mounting surface reflected light RL2 has the highest intensity at the position of the specular reflection member 31 that is directly opposite the measurement unit 20 in the projection direction, and the further from this position of the specular reflection member, the lower the intensity of the mounting surface reflected light RL2. Therefore, by placing the measuring object 41 at a position away from the counterpoint position, that is, at a position avoiding the center position of the imaging range, the brightness around the measuring object 41 can be partially zero. This makes the brightness in a part of the background zero and at least a part of the background can be removed before the calculation of the three-dimensional point group.

In some cases, part of the light reflected by the specular reflection member 31 is further reflected by the measuring object 41 and received by the light receiving device 22. In addition, a part of the light reflected by the measuring object 41 may be further reflected by the specular reflection member 31 and received by the light receiving device 22. Reflected light RL received by the light receiving device 22 through such multiple reflections is called as a multi-pass, which is a factor that reduces the accuracy of shape measurement. The closer the distance between the specular reflection member 31 and the measuring object 41, the more likely this multi-path is to be triggered. For this reason, it is preferable to use a holding component that holds the measuring object 41 in a floating state from the specular reflection member 31. Since the distance between the specular reflection member 31 and the measuring object 41 can be kept longer, the occurrence of multi-path could be reduced.

Second Embodiment

This second embodiment is a variant of the preceding embodiment as the basic configuration. In this embodiment, a retroreflective member 231 forms a mounting surface for mounting the measuring object 41.

Figure 9:
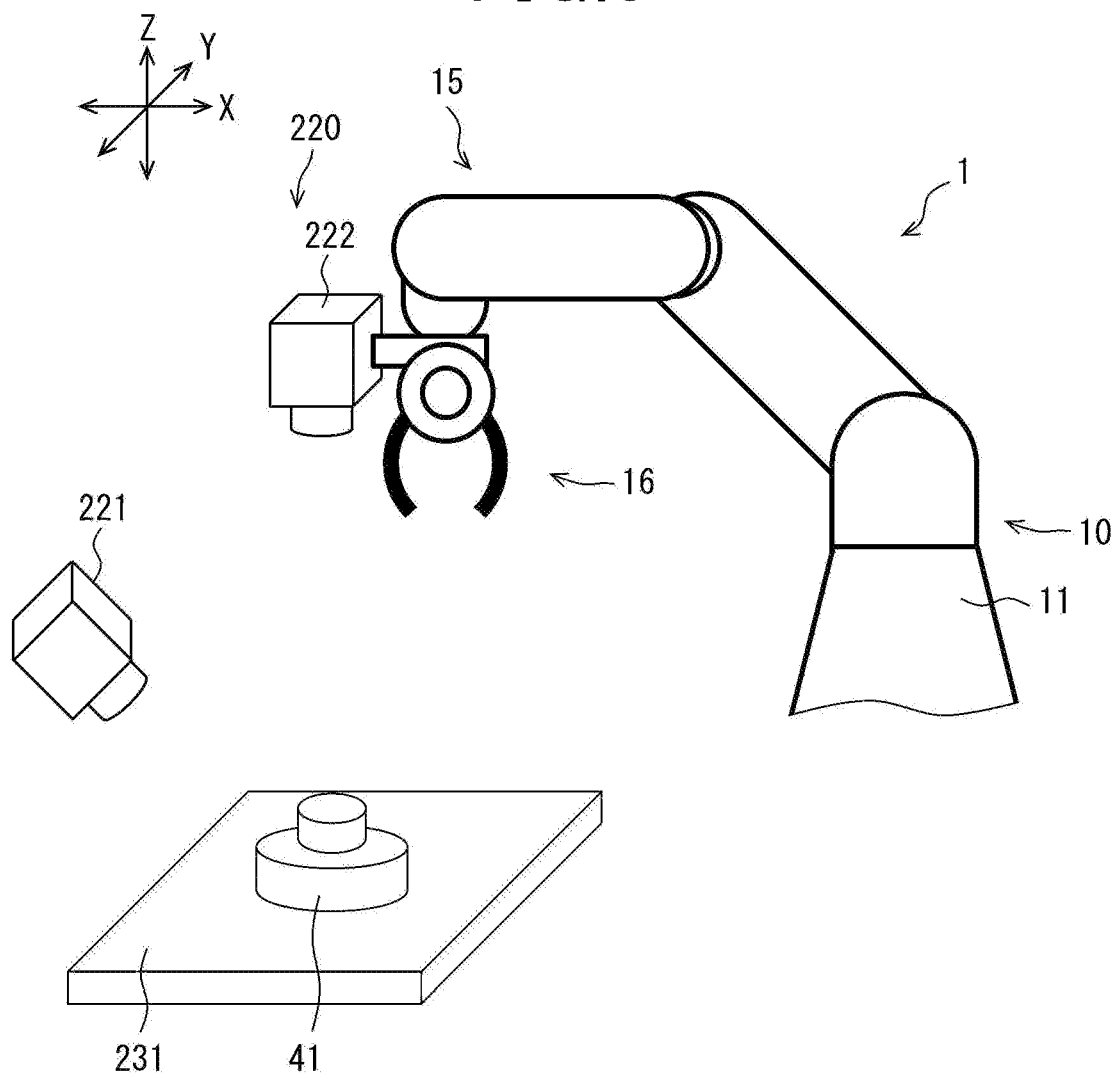
FIG. 9 is a configuration diagram showing the schematic configuration of the recognition system in the second embodiment.

In FIG. 9, a measurement unit 220 is composed of separate light projecting device 221 and light receiving device 222. The light projecting device 221 is fixed to the wall using a special jig. On the other hand, the light receiving device 222 is provided on the robotic hand 16 of the robot 10. Therefore, the position of the light receiving device 222 can be controlled by controlling the movement of the robot 10.

The measuring object 41 is mounted on the retroreflective member 231. The retroreflective member 231 is a member having the property of reflecting incident light so that it returns to the incident direction. Therefore, the reflection angle can be controlled by controlling the incident angle of the light projected on the retroreflective member 231. As the retroreflective member 231, a reflector equipped with a plurality of corner cubes composed of 3 flat plates reflecting light arranged in a cube apex shape so as to be perpendicular to each other can be adopted. However, as the retroreflective member 231, a plate member of a retro-reflector may be adopted to reflect the incident light in a direction parallel to and opposite to the incident direction. Alternatively, as the retroreflective member 231, a member in which retroreflective paint is applied to the plate member may be adopted. The retroreflective member 231 provides an example of a reflective member.

In the case when the color of the measuring object 41 and the retroreflective member 231 are the same color, it is difficult to distinguish between an object 41 and a retroreflective member 231. For this reason, it is preferable to select a different color for the retroreflective member 231 from that of the measuring object 41.

The retroreflective member 231 is a square plate member. However, The shape of the retroreflective member 231 needs to be sufficiently larger than the measuring object 41, and is not limited to the examples described above. For example, a box-shaped component in which a retroreflective plate member is laid on the bottom surface may be adopted as the retroreflective member 231.

Figure 10:
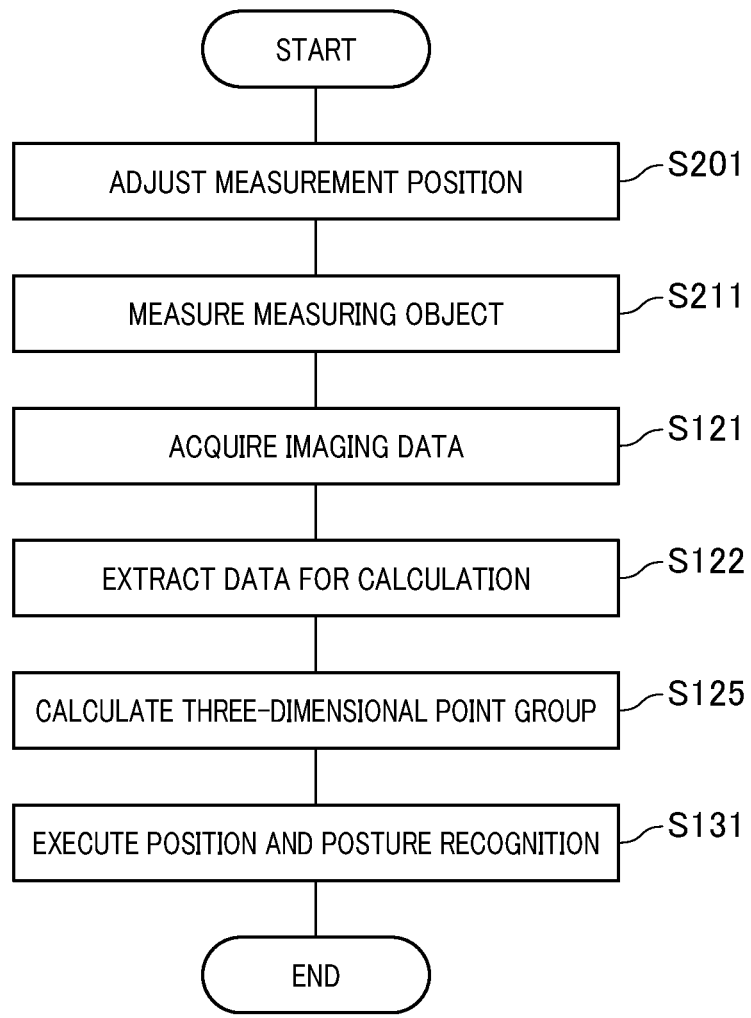
FIG. 10 is a flowchart of the control of the recognition system in the second embodiment.

The flow of the position and posture recognition for recognizing the position and posture of the measuring object 41 using the recognition system 1 is described below. In FIG. 10, when control related to the position and posture recognition is started such that the power of the robot 10 is turned on by the user, the position control unit 71 adjusts the measurement position in step S201. The measurement position is the position of the measurement unit 220 with respect to the retroreflective member 231. More specifically, the position of the light receiving device 222 is adjusted so that the position of the light receiving device 222 is not located on the light projecting direction of the light projecting device 221.

Figure 11:
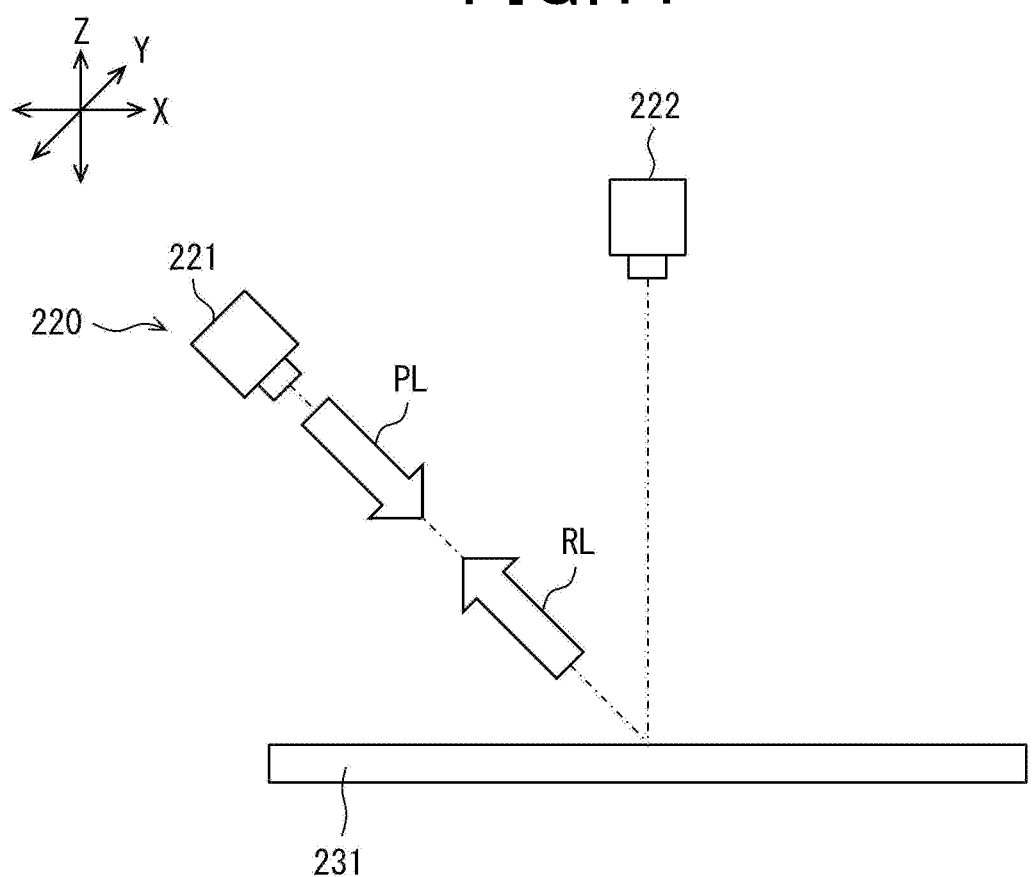
FIG. 11 is an explanatory diagram for explaining the adjustment of the measurement position in the second embodiment

In FIG. 11, the floodlight direction of the light projecting device 221 is somewhat inclined from the direction perpendicular to the mounting surface, which is the upper surface of the retroreflective member 231. On the other hand, the light receiving device 222 is positioned directly above the object 41 to be measured. The projected light PL projected from the light projecting device 221 is retro-reflected by the retroreflective member 231. Thus, the reflected light RL travels parallel to and opposite to the projected light PL. That is, the reflected light RL travels in a direction where the light receiving device 222 does not exist and does not return to the light receiving device 222. It can be stated that the light receiving device 222 is provided at a position avoiding the traveling direction of the reflected light RL reflected by the retroreflective member 231. After adjusting the measurement position, the process proceeds to step S 211.

In step S211, the control unit 70 measures the measuring object 41 using the measurement unit 220. More specifically, the phase shift method is used to measure the three-dimensional shape of the measuring object 41. The position of the light receiving device 222 relative to the light projecting device 221 is not always fixed. Therefore, when imaging the measuring object 41, the distance between the light projecting device 221 and the light receiving device 222 is calculated and used for triangulation.

Figure 12:
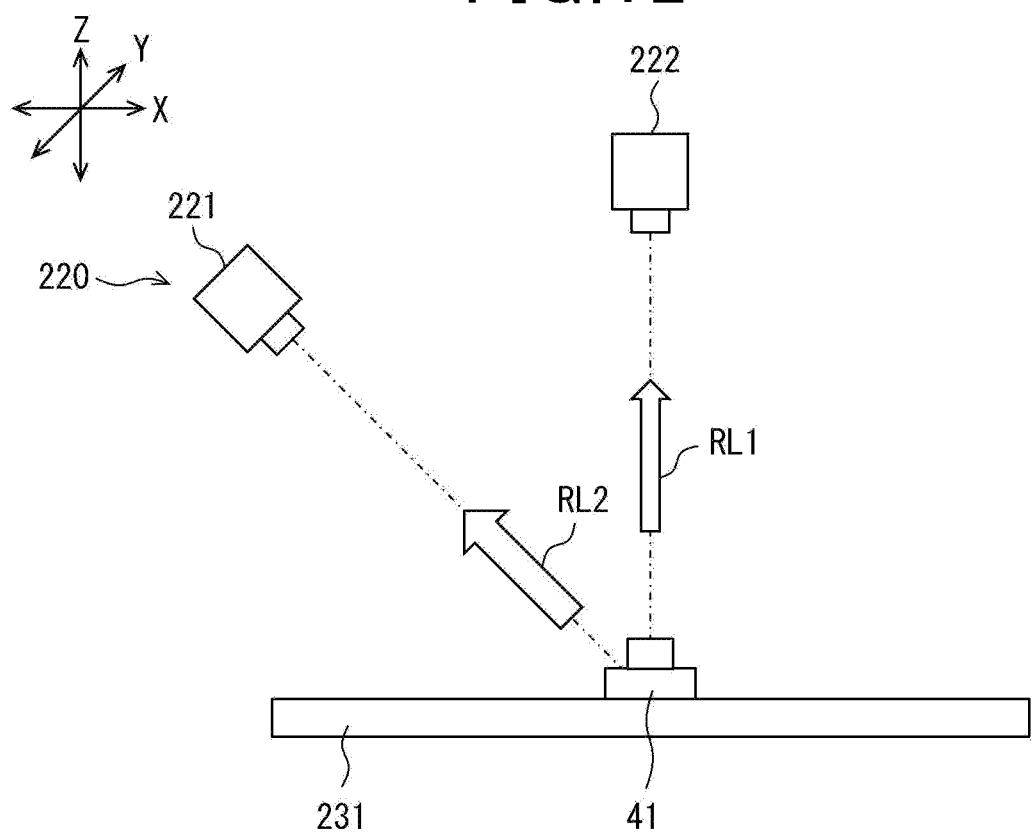
FIG. 12 is an explanatory diagram for explaining reflected light in the second embodiment.

In FIG. 12, the projected light PL projected from the light projecting device 221 of the measuring unit 220 is partly reflected by the measuring object 41 and the remainder is reflected by the retroreflective member 231. Hereafter, the reflected light RL reflected by the retroreflective member 231, which is the mounting surface, is sometimes referred to as the mounting surface reflected light RL2.

The object reflected light RL1 spreads in various directions because it diffuses on the surface of the measuring object 41. However, in the figure, only the object reflected light RL1 which toward the measurement unit 220 is shown. On the other hand, the mounting surface reflected light RL2 mostly retro-reflects and travels in a specific direction, although some light is very slightly diffused on the surface of the retroreflective member 231. In the figure, only the mounting surface reflected light RL2 retro-reflected on the surface of the retro-reflecting member 231 is shown.

The projected light PL projected on the retroreflective member 231 is reflected by the retroreflective member 231. At this time, since the reflected light RL travels parallel to and opposite to the incident direction of the projected light PL, it does not go to the light receiving device 222 but goes to the light projecting device 221.

The light-receiving device 222 receives the object reflected light RL1 and obtains information on the brightness at each measurement point of the measuring object 41. On the other hand, it receives almost no light reflected from the mounting surface RL2. That is, the energy of the mounting surface reflected light RL2 toward the light receiving device 222 falls below the lower limit of the receiver sensitivity of the light receiving device 222, and the brightness obtained by the light receiving device 222 becomes zero. Thus, the portion where the measuring object 41 is imaged has a brightness higher than 0, and the background portion where anything other than the measuring object 41 is imaged has 0 brightness. After measuring the measuring object 41, the process proceeds to step S121.

In step S121, the data acquisition unit 72 acquires imaging data. Then, the process proceeds to step S122, where the data extraction unit 73 extracts data for calculation. Then, the process proceeds to step S125, where the coordinate calculation unit 75 calculates a three-dimensional point group. Then, the process proceeds to step S 131, where the recognition execution unit 79 executes the position and posture recognition. After the completion of the position and posture recognition, when another measuring object 41 is recognized, a series of controls related to the position and posture recognition is repeated.

The effect of the above described embodiment will be described below. According to the above described embodiment, the light receiving device 222 is arranged at a position avoiding the traveling direction of the mounting surface reflected light RL2, which is the light reflected by the retroreflective member 231. Therefore, it is possible to suppress that the reflected light RL received by the light receiving device 222 contains the mounting surface reflected light RL2, which is the light of the background part. Therefore, the influence of light other than the object reflected light RL1 can be reduced to calculate the three-dimensional point group of the measuring object 41 with high accuracy. Accordingly, a three-dimensional measurement system that can remove the background with high precision can be provided.

The measuring object 41 is mounted on the retroreflective member 231. For this reason, the surface reflected light RL2 travels parallel to and opposite to the projected light PL. Therefore, various positions can be adopted as measurement positions, which are positions avoiding the traveling direction of the mounting surface reflected light RL2. In other words, fine angle adjustment is unnecessary as adjustment of the measuring position. Therefore, it is easier to start shape measurement quickly compared to when the measuring object 41 is mounted on the specular reflection member 31.

Third Embodiment

This embodiment is a variant of the preceding embodiments as the basic configuration. In this embodiment, the diffusing member 331 forms a mounting surface for mounting the measuring object 41, and the light receiving device 22 receives the mounting surface reflected light RL2 so that its brightness is not less than the upper limit brightness.

In FIG. 13, the measuring object 41 is mounted on the diffusion member 331. The diffusion member 331 is a member whose surface providing the mounting surface diffuses the incident light in various directions. As the diffusion member 331, a resin member with fine surface irregularities can be adopted. As the diffusion member 331, for example, a target member used for evaluation tests of cameras and sensors with a reflectance of 90% or more can be adopted.

The diffusion member 331 is white which does not easily absorb the energy of the projected light. However, when the measuring object 41 and the diffusing member 331 are the same color, it is difficult to distinguish between the measuring object 41 and the diffusing member 331. For this reason, it is preferable that the color of the diffusing member 331 is selected from a color different from that of the measuring object 41, which is difficult to absorb light energy.

The diffusion member 331 is a square-shaped plate member. However, the shape may be sufficiently larger than the measuring object 41, and is not limited to the examples described above. For example, a box-shaped component in which a plate member with a treatment to facilitate light diffusion is laid on the bottom may be adopted as a diffusing member 331.

Figure 14:
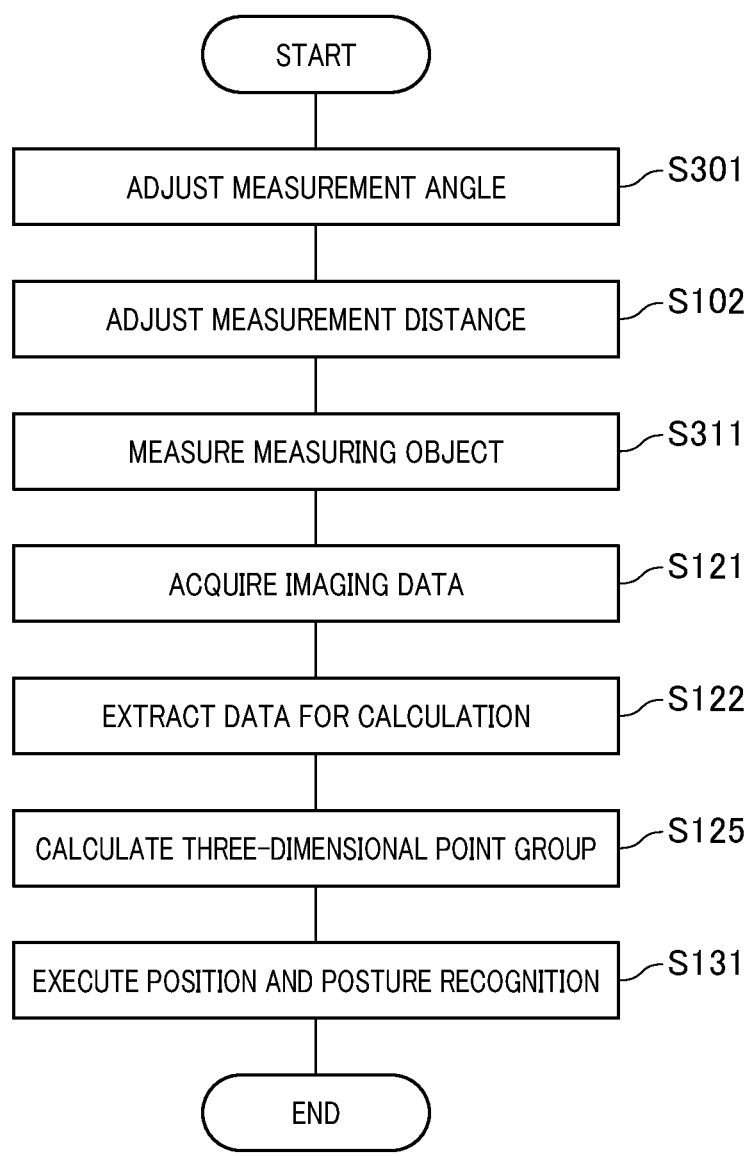
FIG. 14 is a flowchart of the control of the recognition system in the third embodiment.

The flow for recognizing the position and posture of a measuring object 41 using a recognition system 1 is explained below. In FIG. 14, when the power supply of the robot 10 is turned on by the user, the position controller 71 adjusts the measurement angle in step S301. The measurement angle is the angle of the measurement unit 20 to the diffusing member 331. More specifically, the angle of the measurement unit 20 is adjusted so that the direction of the light projection of the measurement unit 20 is in a position relationship that is approximately perpendicular to the mounting surface, which is the upper surface of the diffusing member 331.

Figure 15:
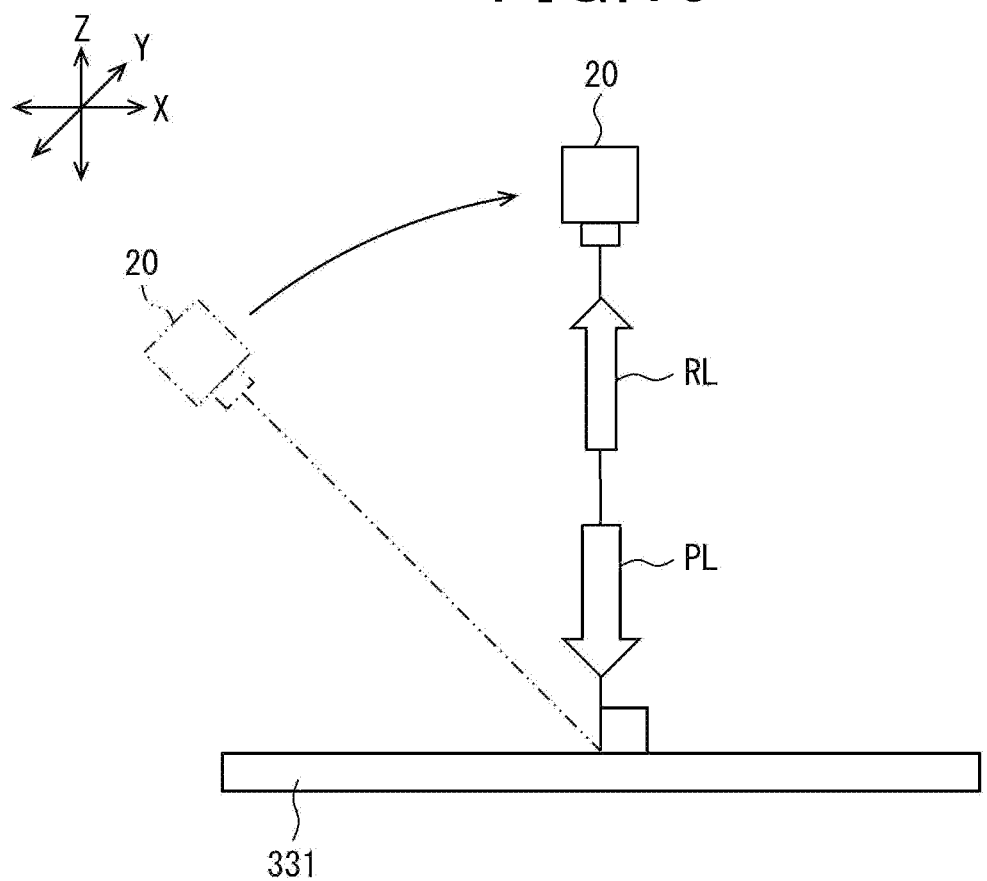
FIG. 15 is an explanatory diagram for explaining the adjustment of the measurement angle in the third embodiment.

In FIG. 15, the light projection direction of the measurement unit 20 is perpendicular to the mounting surface, which is the upper surface of the diffusing member 331. The projected light PL projected from the measurement unit 20 is transmitted in various directions by the diffusing member 331, so that the diffusing results in a state of high intensity of reflected light RL over a wide area. However, since the projection direction is perpendicular to the mounting surface of the diffusion member 331, the reflected light RL is likely to return to the position of the measurement unit 20. In other words, the intensity of the reflected light RL is highest at the position where the projected light PL is projected, and the farther the projected light PL is from the position where it is projected, the lower the intensity of the reflected light RL. The measurement angle of the measurement unit 20 can be stated to be the angle at which the brightness is highest when the reflected light RL is received. In the figure, only the reflected light RL toward the measurement unit 20 is shown.

In the angle adjustment of the measurement unit 20, it is sufficient to adjust the position where much of the reflected light RL reflected by the diffusing member 331 returns to the measurement unit 20. For example, an angle may be adopted in which the light casting direction of the measurement unit 20 is slightly tilted from an angle perpendicular to the mounting surface. Moreover, only the angle of the light receiving device 22 may be adjusted by separately constituting the light projecting device 21 and the light receiving device 22. After adjusting the measurement angle, proceed to step S102.

In step S102, the position control unit 71 adjusts the measurement distance. Thus, the entire measuring object 41 can be imaged, and the distance is adjusted so that the background, which is a configuration other than the measuring object 41, becomes as small as possible. Then, the process proceeds to step S311.

In step S311, the control unit 70 measures the measuring object 41 by using the measurement unit 20 to measure the target. More specifically, the phase shift method is used to measure the three-dimensional shape of the measuring object 41.

Figure 16:
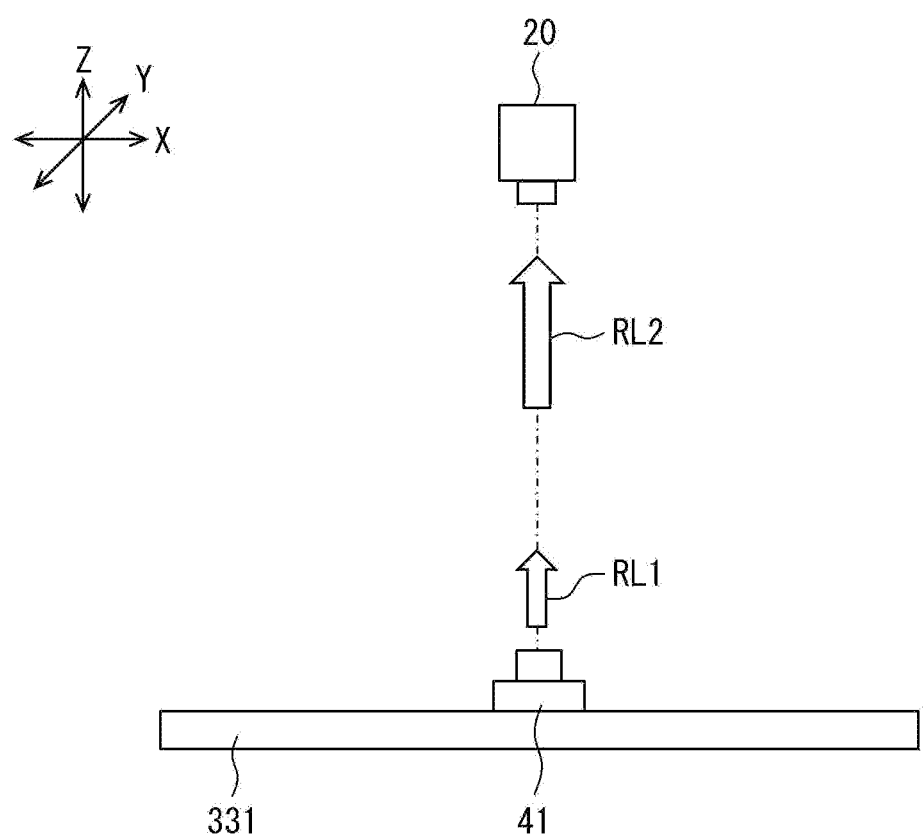
FIG. 16 is an explanatory diagram for explaining reflected light in the third embodiment.

In FIG. 16, the projected light PL projected from the light projecting device 21 of the measurement unit 20 is partly reflected by the measuring object 41 and the rest is diffused by the diffusing member 331. Hereafter, the reflected light RL diffused by the diffusing member 331, which is the mounting surface, is sometimes referred to as the mounting surface reflected light RL2.

Since the object reflected light RL1 is diffused on the surface of the measuring object 41, it is possible for spreading out in the various direction. However, since the angle of the measurement unit 20 is controlled by the measurement angle, the brightness of the part receiving the object reflected light RL1 is lower than the upper limit brightness. In the figure, only the object reflected light RL1 toward the measurement unit 20 is shown.

The mounting surface reflected light RL2 diffuses at the diffusing member 331 and therefore is spread in various directions. Since the angle of the measurement unit 20 is controlled by the measurement angle, the brightness of the part that receives the mounting surface reflected light RL2 becomes a brightness equal to or greater than the upper limit brightness. In the figure, only the mounting surface reflected light RL2 toward the measurement unit 20 is shown.

The energy of the projected light PL projected onto the diffusing member 331 is partially absorbed by the diffusing member 331. At this condition, since the diffusing member 331 is white, the energy absorbed by the diffusing member 331 is smaller than the color such as black. Therefore, it is easy to increase the energy of the light diffused by the diffusing member 331.

The light receiving device 22 of the measurement unit 20 receives the mounting surface reflected light RL2 and obtains the information on the brightness of the diffusing member 331. Since the energy of the mounting surface reflected light RL2 toward the light receiving device 22 exceeds the upper limit of the light receiving sensitivity of the light receiving device 22, the brightness obtained by the light receiving device 22 becomes the saturation brightness. On the other hand, the light receiving device 22 receives the object reflected light RL1 and obtains information of the brightness for each measurement point of the measuring object 41. At this time, the brightness obtained by the light receiving device 22 is lower than the saturation brightness.

Figure 17:
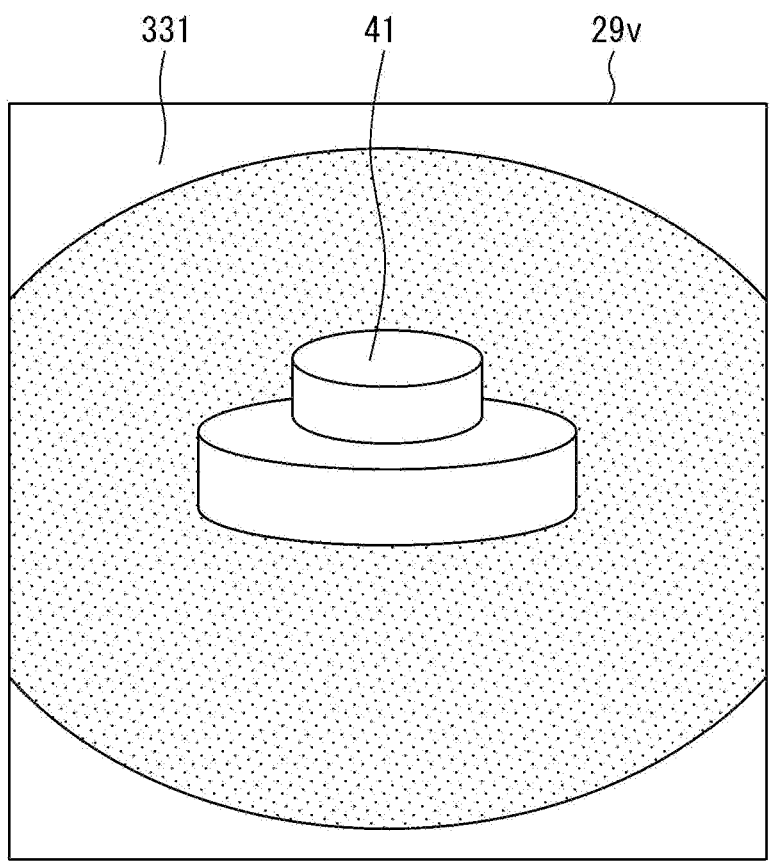
FIG. 17 is a diagram showing a display screen for displaying the brightness obtained by measurement in the third embodiment.

In FIG. 17, the measuring object 41 and the diffusing member 331 are displayed in the display screen 29v. In the figure, the part where the brightness is the saturation brightness is indicated by a dot. In the area where the diffusing member 331 is displayed, the circumference of the measuring object 41 is the saturation luminance. It is stated that the position of the diffusing member 331, which is far from the measuring object 41, has a high brightness but does not reach the saturation brightness. On the other hand, in the area where the measuring object 41 is displayed, the brightness is lower than the saturation brightness. This is because the projected light PL projected on the measuring object 41 is not diffused by the diffusing member 331 but reflected by the measuring object 41. In summary, the brightness of the portion where the measuring object 41 is imaged is lower than the saturation brightness, and at least part of the background portion where the object other than the measuring object 41 is imaged has the saturation brightness. More specifically, it is configured so that the brightness of the portion of the diffusing member 331 that receives the mounting surface reflected light RL2 reflected at least at the standard position reaches the saturation brightness.

The size of the area where the brightness of the part receiving the mounting surface reflected light RL2 becomes the saturation brightness can be controlled by adjusting the exposure time. That is, the longer the exposure time, the greater the amount of light received by the light receiving device 22, so that the brightness tends to be higher and the area where the saturation brightness is achieved can be enlarged. It should be noted, since the brightness of the part that received the object reflected light RL1 is likely to increase by lengthening the exposure time, it is preferable to adjust the exposure time so that the brightness of the part that received the object reflected light RL1 does not become the saturation brightness. After measuring the measuring object 41, the process proceeds to step S121.

In step S121, the data acquisition unit 72 acquires the imaging data. Then, the process proceeds to step S122, where the data extraction unit 73 extracts the data for calculation. The extracted data for calculation does not include pixels that have reached the saturation brightness, where the brightness is set as the upper limit brightness. In other words, the calculation data includes only the background at a position away from the measuring object 41 and the measuring object 41. Then, the process proceeds to step S125, where the coordinate calculation unit 75 extracts a three-dimensional point group. Since the calculation data includes the background at a position away from the measuring object 41 and the measuring object 41, the three-dimensional coordinates of the measuring object 41 and a part of the diffusing member 331 are calculated. Then, the process proceeds to step S131, where the recognition execution unit 79 executes the position and posture recognition. After completion of the position and attitude recognition, another measurement, a series of controls on the position and posture recognition is repeated when the recognition of the measuring object 41 is performed.

The effect of the above described embodiment will be described below. According to the above described embodiment, the light receiving device 22 is arranged in a position where the brightness of the part where the measuring object 41 is imaged becomes lower than the upper limit brightness and the brightness of the part where the diffusing member 331, which is the mounting surface, is imaged becomes higher than the upper limit brightness. Therefore, among the reflected light RL received by the light receiving device 22, it is easy to set the brightness of the mounting surface reflected light RL2, which is the light of the background part, to a saturation brightness or higher. Therefore, it is possible to calculate the three-dimensional point group of the measuring object 41 with high accuracy by calculating the three-dimensional point group by excluding the luminance over the saturation luminance. Accordingly, a three-dimensional measurement system that can remove the background with high precision can be provided.

Diffusion member 331 is white. Therefore, the light projected on the diffusing member 331 is not easily absorbed, that is, the energy of the mounting surface reflected light RL2 is easy to maintain high. Therefore, the brightness of the part receiving the mounting surface reflected light RL2 is easily made to be saturated brightness. Therefore, it is easy to maintain the energy of the light reflected by the diffusing member 331 at a high level and to secure a large portion that becomes saturated brightness.

Fourth Embodiment

This embodiment is also a variant based on the preceding embodiments. In particular, this embodiment solves the problem with the multipath described in the first embodiment.

Figure 18:
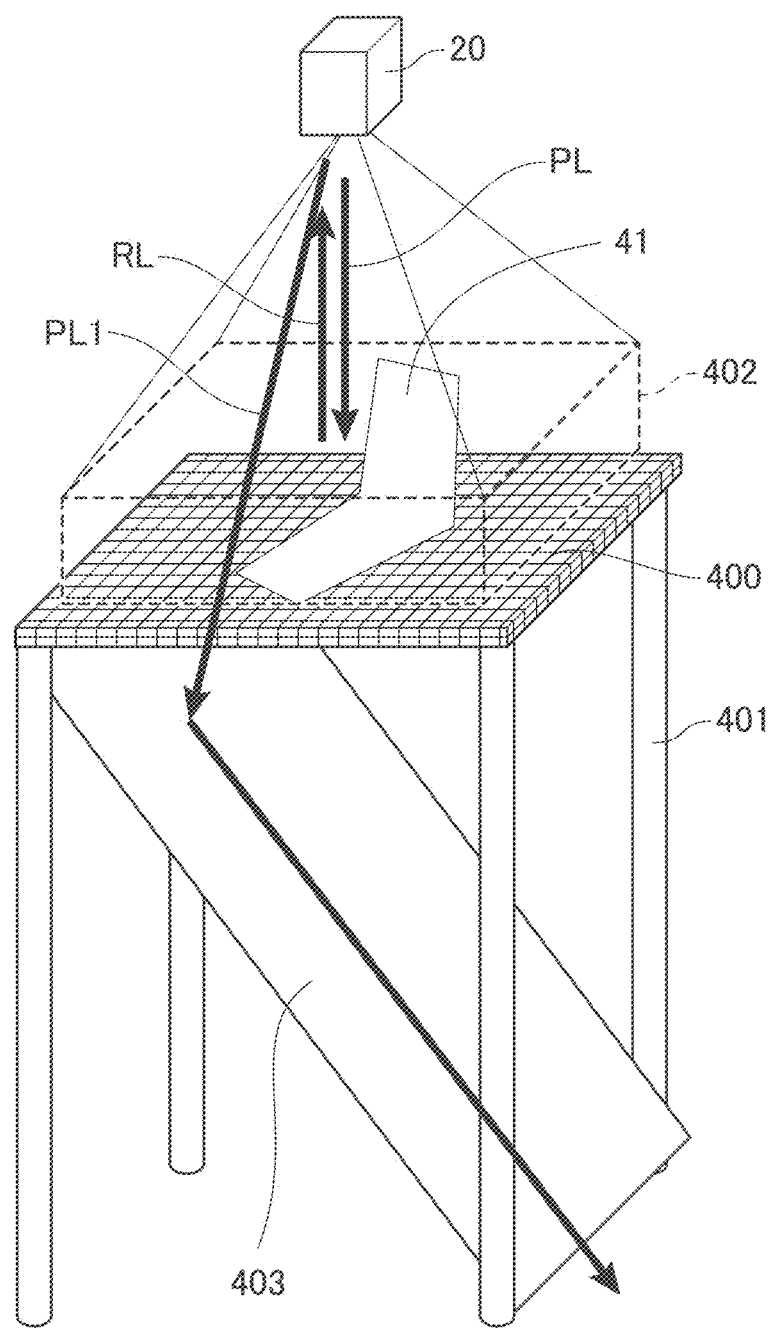
FIG. 18 is a configuration diagram showing the schematic configuration of the recognition system in the fourth embodiment.

In the fourth embodiment, as shown in FIG. 18, the measuring object 41 is held by a holding table 400. The holding table 400 has a mounting surface supported by four legs 401. The mounting surface is a metal honeycomb mesh structure that can adequately withstand the weight of the measuring object 41 to be held. For example, it is made of aluminum or aluminum alloy. And the mesh structures are painted with light-absorbing black paint.

A specular member 403 is placed below the mesh-structured holding table 400. The holding table 400 and the specular member 403 have a specific given angle so that the light that passes through the mounting surface and is reflected by the specular member 403 is prevented from returning to the holding table 400 again. The specular member 403, like the specular reflection member 31 of the first embodiment, is a black reflective material that totally reflects light. Consequently, the light PL1 of the projected light PL that does not go toward the measuring object 41 passes through the holding table 400 and is reflected by the specular member 403 in a direction that does not go toward the measurement unit 20.

The light projecting device 21 of the measurement unit 20 of the fourth embodiment is set to project the projected light PL of near-infrared light of about 900 nanometers. The light receiving device 22 also receives the reflected light RL of the frequency of the projected light PL projected from the light projecting device 21. The space 402 dashed in FIG. 18 shows the measurement range of the measurement unit 20. That is, the projected light PL from the light projecting device 21 is projected into this space 402, and the reflected light RL from this space 402 is directed to the light receiving device 22.

In this fourth embodiment, since the holding table 400 has the mesh structure, the projected light PL passes there through. Moreover, since the mesh-structured holding table 400 is painted in matte black, there is no problem of multi-pass caused by the holding table 400. Since the projected light PL1 passing through the mesh structure is reflected by the specular member 403 in a direction that does not return to the holding table 400 of the mesh structure, the mounting surface reflected light (RL2) does not return to the light receiving device 22 of the measurement unit 20. That is, only the reflected light RL1 from the measuring object 41 enters the measurement unit 20. Therefore, there is no problem of multipath due to the projected light PL passing through the mounting surface.

Near-infrared components are included in outdoor natural light, but the measurement unit 20 is installed indoors. Therefore, in the environment where the measurement unit 20 is installed, there is usually no component of near-infrared light in the ambient light. Accordingly, even if ambient light is reflected by the specular member 403 and is directed toward the light receiving device 22 of the measurement unit 20, the light receiving device 22 does not detect the ambient light. This ensures that ambient light is not a disturbance factor and the measurement unit 20 could make accurate measurements.

Fifth Embodiment

Figure 19:
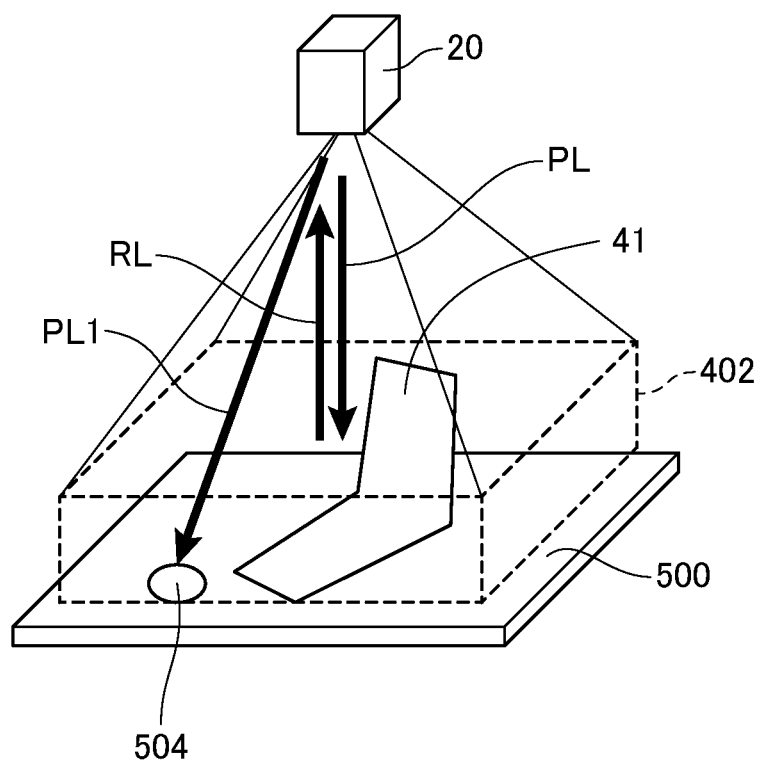
FIG. 19 is a configuration diagram showing the schematic configuration of the recognition system in the fifth embodiment.

The fifth embodiment is also a modification based on the previous embodiments, in which a light absorbing member 500 is used for the mounting surface as shown in FIG. 19.

Figure 20:
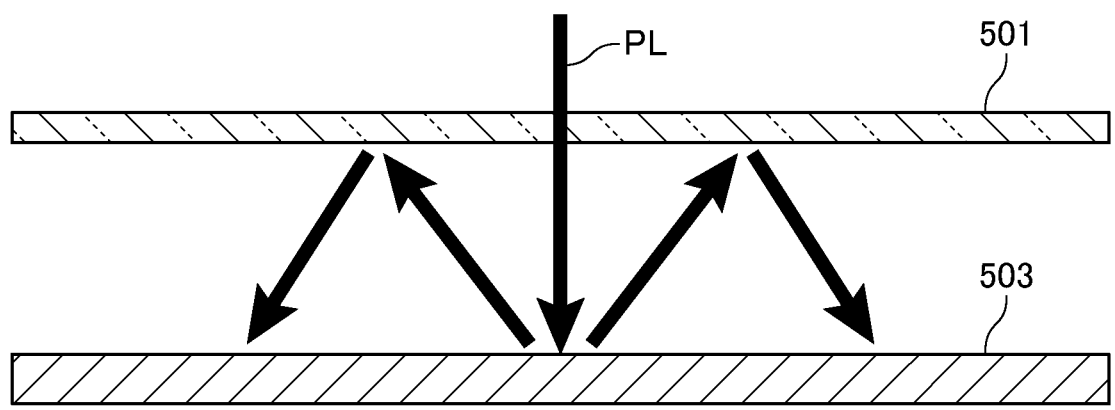
FIG. 20 is a structural diagram showing the light absorbing member in the fifth embodiment.

For the light absorbing member 500, as shown in FIG. 20, the incidence angle filter 501 and a diffusely reflecting material 502 are arranged at a predetermined interval. The incident angle filter 501 has the property of passing only the projected light PL that is normally incident and reflecting the angled incident light. The measuring object 41 is placed on this incident angle filter 501. In FIG. 20, the incident angle filter 501 is shown in a planar shape, but it has a bowl-shaped cross section with an arc shape centered on the light projecting device 21 so that the projected light PL that enters normally can pass through.

On the other hand, the diffusely reflecting material 502 diffuses the incident light and does not reflect it in the opposite direction. Therefore, the projected light PL passing through the incident angle filter 501 can be effectively suppressed from passing through the incident angle filter 501 again to become the mounting surface reflected light RL. In other words, the projected light PL hitting the mounting surface consisting of the light absorbing member 500 is confined between the incident angle filter 501 of the mounting surface and the diffusely reflecting material 502, and does not reflect to the measurement unit 20 side.

Therefore, only the object reflected light RL1 of the projected light PL, which is the light toward the measuring object 41 and reflected by the object 41, is directed toward the light receiving device 22 in the opposite direction. The light PL1 that goes to the portion 504 of the projected light PL that does not go to the measuring object 41 does not become the reflected light RL.

A metamaterial member may be used as the light absorbing member 500. The metamaterial members can also have very low reflective properties.

Other Embodiments

The disclosure in this specification and drawings, etc., is not limited to the illustrated embodiments. The disclosure encompasses the illustrated embodiments and variations by those skilled in the art based on them. For example, the disclosures show parts and/or elements are not limited to a combination of elements. The disclosures can be made in a variety of combinations. The disclosure may have additional parts that can be added to the embodiment. The disclosure includes parts and/or elements of the embodiment omitted. The disclosures encompass the replacement or combination of parts and/or elements between one embodiment and another. The disclosed technical scope is not limited to the description of the embodiments. Some technical scope to be disclosed is indicated by the statement of claim(s) and should be further interpreted as including the statement of claim(s) and all changes within the same meaning and scope.

The disclosure in the specification, drawings, etc., is not limited by the statement of the scope of the claim(s). The disclosures in the specification, drawings, etc., encompass the technical ideas stated in the claim(s) and extend to a wider variety of technical ideas than those stated in the claim(s). Therefore, a variety of technical ideas can be extracted from the disclosure of the description, drawings, etc., without being bound by the statement of the scope of claim(s).

The control unit and its methods described in this disclosure may be implemented by a dedicated computer comprising a processor programmed to perform one or more functions embodied by a computer program. Alternatively, the devices and techniques described in this disclosure may be realized by dedicated hardware logic circuits. Alternatively, the devices and techniques described in this disclosure may be realized by one or more dedicated computers consisting of a combination of a processor executing a computer program and one or more hardware logic circuits. The computer program may also be stored on a computer readable non transition tangible recording medium as instructions executed by the computer.

I claim:

1. A three-dimensional measurement system to measure three-dimensional shape of a measuring object comprising:

a measurement unit that images the measuring object having a light projecting device that projects a near-infrared projection light onto the measuring object and a light receiving device that receives reflected near-infrared light, which is the light reflected by the projected light, a mesh structured holding table that forms a mounting surface on which the measuring object is placed and through which the projected light can pass, a specular member that reflects light passing through the mesh structured holding table in a direction that does not return to the mesh structured holding table, a data acquisition means for acquiring imaging data imaged using the measurement unit, and a coordinate calculation means for calculating three dimensional coordinates for a portion of the imaging data whose brightness is higher than a lower limit brightness and does not calculate the three dimensional coordinates for a portion whose brightness is lower than the lower limit brightness, wherein the mesh structured holding table is painted matte black.

2. A three dimensional measurement system to measure three-dimensional shape of a measuring object comprising:

a measurement unit that images the measuring object having a light projecting device that projects a near-infrared projection light onto the measuring object and a light receiving device that receives reflected near-infrared light, which is the light reflected by the projected light, a mesh structured holding table that forms a mounting surface on which the measuring object is placed and through which the projected light can pass, a specular member that reflects light passing through the mesh structured holding table in a direction that does not return to the mesh structured holding table, and a computer comprising a processor programmed to:

acquire imaging data imaged using the measurement unit, and calculate three dimensional coordinates for a portion of the imaging data whose brightness is higher than a lower limit brightness and does not calculate the three dimensional coordinates for a portion whose brightness is lower than the lower limit brightness, wherein the mesh structured holding table is painted matte black.

* * * * *